3,155,490
PREPARATION OF AMMONIUM PHOSPHATE FERTILIZER
Darwin Fiske De Lapp, New Canaan, Conn., assignor to American Cyanamid Company, Stamford, Conn., a corporation of Maine
No Drawing. Filed July 2, 1962, Ser. No. 207,087
3 Claims. (Cl. 71—42)

This invention relates to a method for the manufacture of monoammonium phosphate. More particularly, it relates to the manufacture of monoammonium phosphate suitable for use as a liquid fertilizer prepared from crude wet process phosphoric acid.

As is known, crude wet process phosphoric acid, usually analyzing between about 32% $P_2O_5$ and about 54% $P_2O_5$, contains small amounts of aluminum and iron impurities. When neutralized with ammonia, crude wet process phosphoric acid is converted to ammonium phosphate which is characterized as a gelatinous, gummy material of relativley high viscosity. Consequently, it cannot be employed in spraying equipment commercially used for applying liquid fertilizers.

It is, therefore, a principal object of the present invention to provide a method for utilizing crude wet process phosphoric acid so as to convert this acid to the corresponding monoammonium phosphate suitable for use in liquid fertilizer spray equipment. It is a further object of the invention to prepare a gelatinous-free monoammonium phosphate capable for use as a liquid fertilizer in which the iron and aluminum impurities do not interfere with the nozzles of spray equipment. Other objects and advantages of the invention will become apparent from a consideration of the ensuing description.

To this end, wet process crude phosphoric acid is ammonia-neutralized to a pH equal to between about 4.0 and about 4.5, whereby monoammonium phosphate is obtained. The latter is then heat-treated at temperatures between about 150° C. and 190° C. Thereafter, the so heat-treated monoammonium phosphate is cooled to about room temperature and, finally, further neutralized to a pH between about 7 and 9 by the addition thereto of ammonium hydroxide. Resultant product is a liquid which contains a minute quantity of insolubles which are separated such as by decantation or filtration. Clarified liquid contains substantially ammonium phosphate which can be readily employed as a liquid fertilizer for use in spraying equipment.

In general, any commercially available crude wet process phosphoric acid is contemplated. Usually, wet process acid containing from about 32% $P_2O_5$ to 54% $P_2O_5$ is preferred. As stated previously, such acids contain iron and aluminum impurities as well as fluorine.

It has been found that the temperature for effecting heat-treatment of monoammonium phosphate, prepared by drying a previously neutralized crude wet process phosphoric acid solution having a pH equal to between about 4.0 and about 4.5, must be maintained within a critical range from about 150° C. to about 190° C. for a period from about ten minutes to sixty minutes. If a temperature lower than about 150° C. is employed, the resultant neutralized acid gels to a dense state and is not flowable. If, on the other hand, the temperature is higher than about 190° C., the so-neutralized acid is a gummy, sticky product.

In order to facilitate a further understanding of the invention, the following examples are presented primarily for the purpose of illustrating certain more specific details thereof. The scope of the invention is not to be deemed limited thereby except as defined in the claims. Unless otherwise noted, all parts are by weight.

*Example 1*

This example illustrates the effect of temperatures below 150° C. on crude monoammonium phosphate.

Five-hundred and fifty (550) parts of 54% $P_2O_5$ wet process phosphoric acid are neutralized with aqueous ammonium hydroxide to a pH of 4.0. The resultant slurry is dried in a flat stainless steel tray at 100° C. for forty-five minutes. Dry particles of approximately $\frac{1}{8}''$ to $\frac{1}{4}''$ in diameter are obtained by breaking up the surface crust of the dried neutralized wet process phosphoric acid. Thereafter, 5 parts of the so-obtained dried product are dispersed in 10 parts of water and neutralized to a pH of 8 with ammonium hydroxide. The so-neutralized product is a dense gel.

*Example 2*

This example illustrates the use of temperatures of at least 150° C. on crude monoammonium phosphate.

Five-hundred and fifty (550) parts of 54% $P_2O_5$ wet process phosphoric acid as in Example 1 above are neutralized with aqueous ammonium hydroxide to a pH of 4.2. One-hundred (100) parts of the so-neutralized product are dried at about 100° C. and the dried monoammonium phosphate product is next heat-treated at 150° C. for forty-five minutes on a flat stainless-steel tray. Cooling the resultant dried product at about room temperature, 5 parts of the cooled product are dissolved in 10 parts of water and neutralized to a pH of 8.0 with ammonium hydroxide. A small residue of insoluble materials is observed which is readily filtered off. A flowable ammonium phosphate solution capable for use in spraying equipment is obtained.

*Example 3*

Repeating the procedure of Example 2 in every respect except that the heating temperature is increased from 150° C. to 180° C. and the residence time is fifteen minutes, a flowable product capable for use as a liquid fertilizer is obtained.

In the above procedure, the increase of the initial heat treatment temperatures to 190° C. produces similar results.

*Example 4*

This example illustrates the use of temperatures in excess of 190° C.

As in Example 2 above, the initially heat-treated crude phosphoric acid neutralized to a pH of 4 by means of ammonium hydroxide, is converted to a gummy, sticky material when held at 200° C. for between about fifteen and about thirty minutes. Resultant solid product causes handling difficulties because it is not flowable.

*Example 5*

This example illustrates the preparation of a complete fertilizer.

Five (5) parts of the monoammonium phosphate product obtained from Example 2 above are admixed with 4.5 parts of potassium chloride and dissolved in 12 parts of water. The solution is neutralized to a pH of 8.0 with ammonium hydroxide. This solution contains the three primary plant nutrients, namely, nitrogen, phosphorous and potassium comprising a complete fertilizer.

I claim:

1. In a process for the manufacture of a non-gelatinous monoammonium phosphate directly from wet-process phosphoric acid, the improvement which comprises: adding sufficient ammonium hydroxide to wet process phosphoric acid having from about 32% to about 54% $P_2O_5$ and containing small amounts of aluminum and iron until the pH of the latter acid is increased to from 4.0 to 4.5 to obtain monoammonium phosphate; heating said monoammonium phosphate at a temperature between about 150° C. and 190° C.; cooling the resultant heat-treated product to about room temperature; neutralizing the latter cooled product to a pH between 7 and 9 by adding thereto sufficient aqueous ammonium hydroxide; and thereafter recovering a liquid, non-gelatinous monoammonium phosphate.

2. A process according to claim 1, in which the heat treatment of the crude monoammonium phosphate is carried out at a temperature of about 150° C.

3. A process according to claim 1, in which the heat treatment of the crude monoammonium phosphate is carried out at a temperature of about 180° C.

References Cited in the file of this patent

UNITED STATES PATENTS

| | | |
|---|---|---|
| 2,891,856 | Getsinger et al. | June 23, 1959 |
| 3,037,855 | Smith | June 5, 1962 |
| 3,044,851 | Young | July 17, 1962 |
| 3,057,711 | Reusser et al. | Oct. 9, 1962 |